United States Patent [19]

Slater

[11] Patent Number: 4,872,106

[45] Date of Patent: Oct. 3, 1989

[54] INDUSTRIAL PROCESS CONTROL SYSTEM WITH BACK-UP DATA PROCESSORS TO TAKE OVER FROM FAILED PRIMARY DATA PROCESSORS

[75] Inventor: Billy R. Slater, Plano Collin, Tex.

[73] Assignee: New Forney Corp., Carrollton, Tex.

[21] Appl. No.: 14,104

[22] Filed: Feb. 4, 1987

Related U.S. Application Data

[63] Continuation of Ser. No. 482,487, Apr. 6, 1983, abandoned.

[51] Int. Cl.⁴ .............................................. G06F 15/00
[52] U.S. Cl. .................................. 364/200; 364/268; 364/268.3; 364/268.4; 364/269.7; 364/244; 364/244.8
[58] Field of Search ... 364/200 MS File, 900 MS File, 364/138, 187; 371/8, 9, 49, 53, 68; 340/825.26, 825.36

[56] References Cited

U.S. PATENT DOCUMENTS

| | | | |
|---|---|---|---|
| 3,636,331 | 1/1972 | Amrehn | 364/187 |
| 3,692,989 | 9/1972 | Kandiew | 364/200 |
| 3,786,433 | 1/1974 | Notley et al. | 371/9 |
| 3,937,934 | 2/1976 | Pasemann | 364/138 |
| 4,133,027 | 1/1979 | Hogan | 364/200 |
| 4,141,066 | 2/1979 | Keiler | 364/200 |
| 4,169,288 | 9/1979 | Fairman et al. | 364/900 |
| 4,208,650 | 6/1980 | Horn | 371/47 |
| 4,208,715 | 6/1980 | Kumahara et al. | 364/200 |
| 4,304,001 | 12/1981 | Cope | 371/8 |
| 4,323,966 | 4/1982 | Whiteside et al. | 364/200 |
| 4,351,023 | 9/1982 | Richer | 364/187 |
| 4,358,823 | 11/1982 | McDonald et al. | 364/200 |
| 4,413,319 | 11/1983 | Schultz et al. | 364/200 |
| 4,443,846 | 4/1984 | Adcock | 364/200 |
| 4,488,231 | 12/1984 | Yu et al. | 364/200 |
| 4,672,537 | 6/1987 | Katzman et al. | 364/200 |

Primary Examiner—Eddie P. Chan
Assistant Examiner—Jonathan C. Fairbanks
Attorney, Agent, or Firm—Lane and Aitken

[57] ABSTRACT

In an industrial process control system, in which a plurality of remote stations interconnected by a communications link each control and manage a plurality of input/output devices, each remote station comprises a primary data processor and a back-up data processor. The primary data processor normally exercises control over and manages the input/output devices, but, should the primary data processor fail, the back-up processor takes over management and control of the input/output devices. Periodically, the primary data processor transfers status data relating to its operation in the control of the input/output devices to the back-up data processor via a dual ported memory connected between the two processors. The back-up processor maintains a record of the status data and updates its record of the status data with the periodically transferred copy of the status data. Prior to updating its record of the status data, the back-up processor does a validity check on the transferred copy of the status data and updates its record of the status data if, and only if, the transferred copy of the status data is determined to be valid.

8 Claims, 5 Drawing Sheets

INDUSTRIAL PROCESS CONTROL SYSTEM WITH BACK-UP DATA PROCESSORS TO TAKE OVER FROM FAILED PRIMARY DATA PROCESSORS

This is a continuation of U.S. application Ser. No. 482,487 filed on April 6, 1983, now abandoned.

BACKGROUND OF THE INVENTION

This invention relates to a data processing system used to control an industrial process wherein a back-up data processor or processors are used to automatically assume control over the industrial process when the primary processor controlling the industrial process fails.

Many system type industrial installations, such as those related to industrial process-type manufacturing and electrical power generation, often employ a large number of physically distributed control devices and associated sensors for effecting coordinated operation of the overall system. One such system is disclosed in Michael E. Cope U.S. Pat. No. 4,304,001 and assigned to the assignee of this application. In the Cope application, a plurality of remote stations are connected to various control devices and sensors and communicate with one another through a communications link. Each of the remote stations will have a data processor and, at most of the remote stations, these data processors will operate to receive signals from sensors and control process parameters of the industrial process. One of the remote stations would include a control panel to provide operator access to and control of the overall system. In the above described system, as disclosed in the Cope patent, if one of the data processors at a given remote station fails, this will not mean that the entire process control system will fail because the other remote stations will continue to function receiving information from the sensors and controlling the output parameters assigned thereto. Nevertheless, it is important to keep all of the remote stations functioning to maintain efficient automatic operation of the industrial process. To achieve this purpose, the present invention provides at each of the remote stations a back-up processor to take over the input/output operations when the primary processor at the remote station fails.

In the past, it has been proposed to employ redundant or back-up processors to take over from a primary processor when the primary processor fails. However, in such systems, a process upset often occurs when the primary processor fails because of problems in getting the back-up processor to operate on valid data concerning the current status of the process. Proposals have been made in the past to periodically have the primary processor transfer status data to the back-up processor. The problem of process upset still exists because when the primary processor begins to fail, the status data is often contaminated by the problem which caused the primary processor to fail.

SUMMARY OF THE INVENTION

In accordance with the present invention, the primary processor, while carrying out its applications program, periodically transfers a copy of its status into the memory of the back-up processor. The back-up processor, which maintains its own correct record of the status data, does a validity check on the status data and, only if the data is valid, updates the record of the status data. The transfer of data to the memory of the back-up processor is by way of a dual ported memory in which both the primary processor and the back-up processor can store and read out data. Both the primary processor and the back-up processor are provided with a processing unit called a real time executor which controls the communication of the processor with the input and output devices. The real time executor of the primary processor will be connected to other processing units of the primary processor over the primary systems bus and control the input and output devices under the control of the one or more processing units which actually carry out the applications programs for those input/output devices. The back-up processor will also have a real time executor capable of communicating with the input and output devices and connected to the other processing units of the back-up processor over the back-up processor systems bus. When one of the processing units of the primary processor fails, this fact will be detected by the real time executor, which will apply a failover signal to a processor selector module, whereupon the primary processor will cease to exercise control over the input and output devices. The processor selector module will signal the back-up processor that it is now the active processor in response to the failover signal. The back-up processor will then begin exercising control over the input/output devices in accordance with the last valid status data received from the dual ported memory.

In the system of the present invention, because the back-up processor only takes over operation making use of periodically updated status data, which is validated by an error checking system, process upset occurring when the back-up processor takes over from a failed primary processor is minimized.

DESCRIPTION OF THE PREFERRED EMBODIMENT

Figure 1:
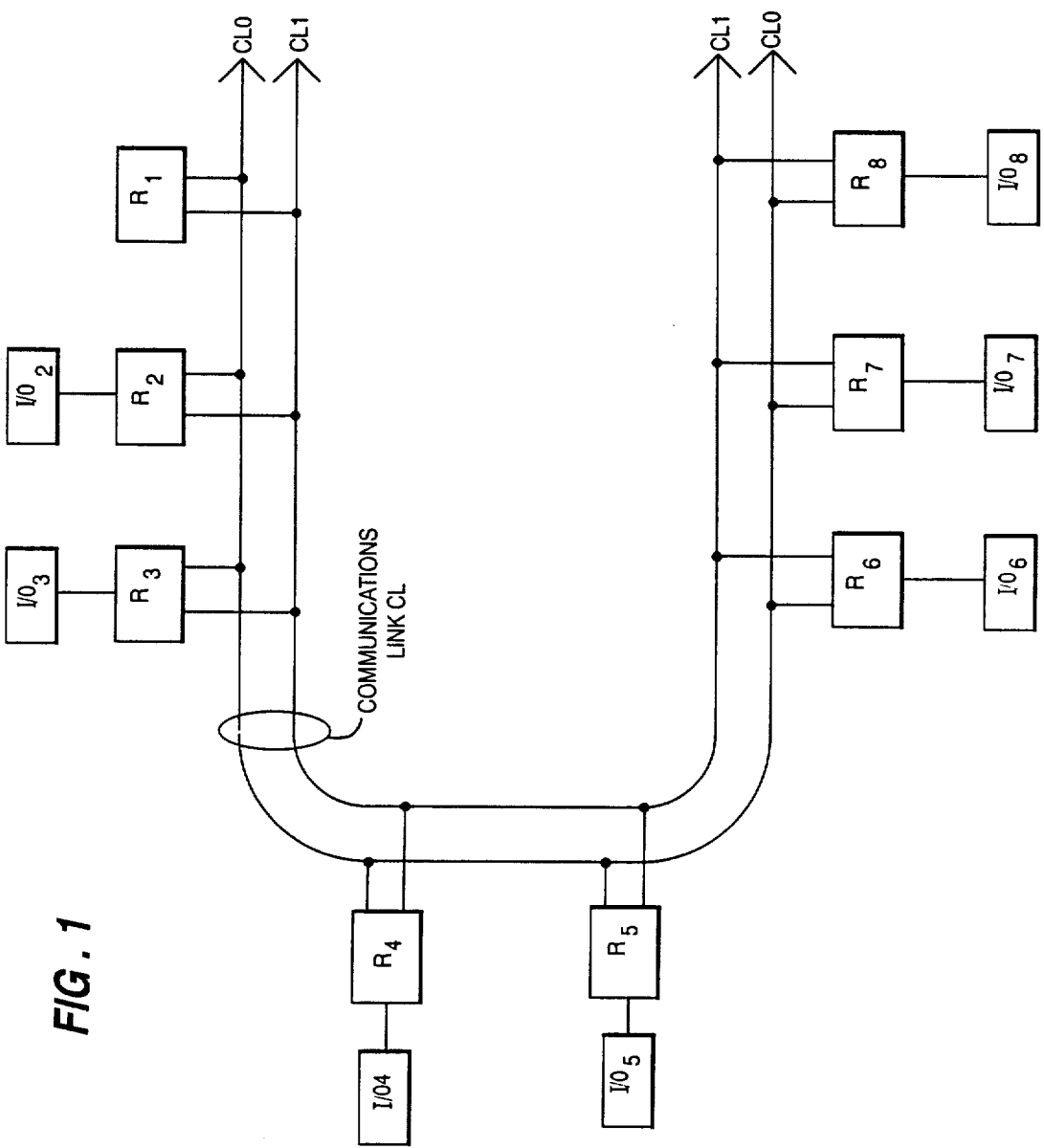
FIG. 1 is a schematic diagram of an industrial control system in which the system of the present invention is employed.

An industrial control system in accordance with the present invention is shown in schematic form in FIG. 1 and includes a communications link CL having a plurality of remote stations R1 through R8 connected thereto. While, for purposes of illustration, only eight remote stations are shown in FIG. 1, it is to be understood that the system is designed to be used with a much larger number of remote stations. The remote stations R2 through R8 control an industrial processor system through input/output devices represented by $I/O_2$ through $I/O_8$, respectively. Each of these remote stations may control a large number of output devices and respond to a large number of input devices and the blocks labeled I/O in FIG. 1 each represent many input and output devices.

The remote station R1 represents the remote station at which a control panel is provided in order to provide operator access and control of the overall system. The remote station R1 is shown without input/output devices, but the remote station R1 may also control input/output devices, if desired. The control panel may be like that disclosed in the copending application Ser. No. 159,599, entitled "Industrial Process Control System", filed June 16, 1980 invented by Billy R. Slater and Dennis Simpson. Alternatively, the control panel may be like that disclosed in copending application Ser. No. 253,964 entitled "Combined Mode Supervisory Program-Panel Controller Method for an Industrial Process Control System", filed April 13, 1981, invented by Billy R. Slater. The remote stations communicate with each other over the communications link CL in the manner disclosed in Michael E. Cope U.S. Pat. No. 4,304,001.

In accordance with the present invention, each of the remote stations R2 through R8 is provided with a primary data processor, which receives information from the input devices and controls the output devices, and a back-up data processor, which is operable to take over the control of the input/output devices from the primary processor in the event the primary processor fails. A back-up processor may also be provided at remote station R1 to take over interaction with the control panel should the primary processor at the remote station R1 fail.

Figure 2:
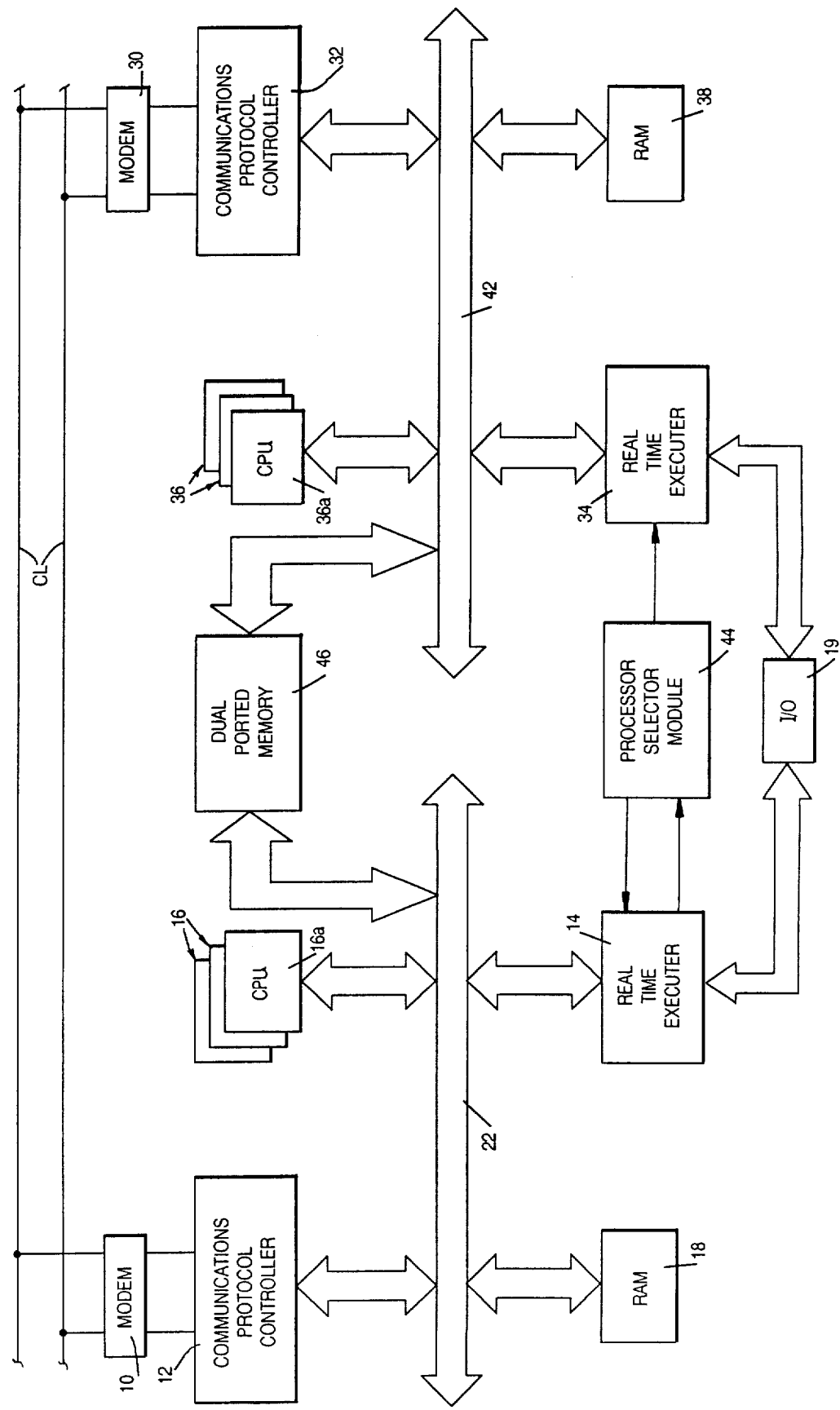
FIG. 2 is a schematic block diagram of one of the remote stations shown in FIG. 1 and schematically illustrating the system of the present invention.

The block diagram of FIG. 2 illustrates an example of a remote station having a primary data processor and a back-up data processor. As shown in FIG. 2, the primary processor at the remote station comprises a modem 10, a communications protocol controller 12, a real time executor 14, one or more central processing units 16, a random access memory 18, and a communications bus 22 which provides addressing, control and information transfer between the devices of the primary data processor. The communications protocol controller 12 comprises a data processing unit and, via the modem 10, interfaces the primary data processor with the communications link CL. The real time executor 14 applies signals to the output devices to control their states in accordance with the determinations made by the primary data processor and receives signals from the input/output devices indicating the states of these input and output devices and, in other words, manages the flow of signals to and from the input/output devices for the primary data processor. The central processing units 16 receive data from the real time executor 14 regarding the status of the input/output devices and also information, directions, or commands from other remote stations via the communications controller 12. Using sequential logic, the central processing units 16, process the data and commands making use of the random access memory 18 and data stored therein and send commands to the real time executor 14 to direct changes in the output devices controlled by the real time executor 14. The sequential logic programs by which the central processing units 16 respond to and control the output devices connected to the real time executor are referred to as applications programs. The details of how protocol controller 12 communicates with the other remote stations via the modem 10 and the communications link CL and the operation of the primary processor in controlling and receiving information from the input and output devices is essentially the same as that described in the above-mentioned Cope U.S. Pat. No. 4,304,001.

The input/output devices normally will include some devices which merely have two states, such as an on and off state or an open or closed state and some remote stations may only have these kind of input and output devices. Some output devices, such as a valve, for example, may have a range of positions and some input signals from input devices, such as a flow meter, may vary over a range of values. The applications programs which control and receive status signals from the two-state devices, for convenience, are referred to as CQ3 applications programs. The applications programs to control the devices which can be set through a range of positions or values and which operate on input signals which can vary through a range of values, for convenience, are referred to as the CQ4 applications programs. When both CQ3 and CQ4 applications programs are implemented at a remote station, then the CQ3 applications program or programs will be carried out on one or more central processing units 16 and the CQ4 applications program or programs will be carried out on one or more separate central processing units 16. In addition to these programs, the primary data processor will also carry out housekeeping functions by means of a program called a system program and the system program will be implemented on one of the central processing units 16, which is called the system processing unit and which is specifically designated 16a. The system processing unit will also usually be programmed to execute one of the CQ3 programs or it may be programmed to execute a CQ4 program.

The details of a CQ4 program and how it operates are disclosed in the above-mentioned copending application Ser. No. 253,964. As disclosed in this copending application, a CQ4 program is divided into mathematical blocks each capable of performing different mathematical functions including, for example, the function to add the sum of a plurality of input values, subtract one input value from another input value, divide one input value by another input value, or perform a simulated analog control function called a PID loop wherein the output is a defined function of the difference between an input variable and a set point. Another example of a block in the CQ4 program is for scaling purposes and produces an output which is the input variable multiplied by a constant plus a second constant. Still other examples of blocks are ones which select the higher or lower of two or more input values. Additional examples of the different blocks of the CQ4 program are described in the above-mentioned copending application Ser. No. 253,964. A CQ4 applications program will perform the block functions in a selected sequence which is referred to as the strategy of the CQ4 program.

In accordance with the present invention, at each remote station R2 through R8, there is a back-up processor which is essentially identical to the primary processor and comprises a modem 30, a communications protocall controller 32, a real time executor 34, one or more central processing units 36, including a system processing unit 36a, a random access memory 38 and a communications bus 42, which are operable to interact with each other and control the input and output devices 19 in the same manner as in the primary processor. The back-up processor is operable to communicate with other remote stations over the communications link CL via the communications protocall controller 32 and the modem 30 in the same manner that the primary processor can send and receive communications over the communications link. Normally, the back-up processor will be in a back-up mode of operation and will not operate to exercise control over the input/output devices or receive data concerning the states of the input/output devices and the control over the input/output devices is exclusively carried out by the primary processor. In addition, the back-up processor in the back-up mode of operation will not communicate with other remote stations over the communications link. However, should the primary processor fail, the back-up processor then will automatically take over control of and receive the signals and data from the input/output devices 19 and communicate with the other remote stations in the same manner as the primary processor.

The back-up processor, in order to be able to take over operations from the primary processor, has to have an applications program or programs which it is capable of executing identical to that of the primary processor. However, since only one of the primary processors and the back-up processor can be active in carrying out the applications program, means must be provided to select one of the two processors, the primary processor, or the back-up processor to be the active processor. This function is carried out by a processor selector module 44. The processor selector module 44 will normally select the primary data processor to be the active processor and carries out the selection by setting a status byte in the real time executor 14 to a predetermined code, referred to as ACTIVE, which indicates the active mode of operation. The corresponding status byte in the real time executor 34 of the back-up processor will be set by the processor selector module to a code, referred to as INACTIVE, to indicate back-up operation. The system processing unit 16a in the primary processor monitors the status byte in the real time executor 14 and, when the status byte is set to ACTIVE, the system program causes the processing units 16 to carry out the CQ3 and CQ4 programs. The system processing unit 36a of the back-up processor also monitors the status byte in the real time executor 34 and, in response to the code in this byte being set to INACTIVE, carries out a back-up system program, as is described in more detail below.

When the primary processor fails, this fact is detected by the real time executor 14 in the manner described below and, in response to such failure, the real time executor 14 will apply a failover signal to the processor selector module 44 indicating that the primary processor has failed. In response to receiving this signal, the processor selector module 44 will set the status byte in the real time executor 14 to INACTIVE and will set the status byte in the real time executor 34 to ACTIVE, whereupon the system processing unit 36a in the back-up processor, which is monitoring the status byte in the real time executor 34 will cause the processing units 36 of the back-up processor to carry out the CQ3 and CQ4 applications programs.

A dual ported memory 46 has one port connected to the communications bus 22 of the primary processor and a second port connected to the communications bus 42 of the back-up processor. The primary data processor maintains in the random access memory 18 a record of the status data relating to the current operation of the CQ3 applications program and operates on and in response to this status in carrying out the CQ3 applications programs. Upon each cycle through the CQ3 program or programs by each of the processing units executing a CQ3 program, the system processing unit will transfer a copy of the CQ3 status data from the record thereof in the random access memory 18 to the dual ported memory 46. The status data transferred includes the status of each of the input and output devices controlled by CQ3 programs, the states of all the flags, timers, counters, operated on in the CQ3 programs, the contents of any message related to the CQ3 programs, and the instruction pointer for each processing unit which is executing a CQ3 program. The instruction pointer identifies which instruction in the sequence of instructions making up a CQ3 program is the next instruction to be executed.

The program instruction at which the transfer of the status data to the dual ported memory takes place is called the drop instruction. If more than one processing unit 16 is executing a CQ3 program, then when each CQ3 program reaches the drop instruction, it sets a byte in the random access memory assigned to that CQ3 program to READY. When all of the bytes for each CQ3 program being executed by a different processing unit have been set to READY, the system processing unit 16a will execute the drop routine, in which the CQ3 status data is copied from the random access memory 18 into the dual ported memory. The other processing units executing CQ3 programs wait at the drop instruction until the system processing unit has completed the drop routine whereupon all of the processing units executing CQ3 programs proceed with their individual CQ3 applications programs. The system processing unit calculates a check sum from the status data and stores the check sum in the dual ported memory along with the CQ3 status data. The check sum is a byte, the bits of which depend upon the value of each bit of status data. The bits of the check sum may, for example, be determined by the exclusive OR result of combining the corresponding bits in each byte of status data.

After the CQ3 status data has been stored in the dual ported memory, the system processing unit of the back-up processor, operating in the back-up mode, transfers the copy of the status data and the check sum into a buffer memory section of the random access memory 38 of the back-up processor. After transferring the copy of the status data into the buffer memory portion of the random access memory 38, the systems processing unit 36a recomputes the check sum from the copy of the status data and compares it with the check sum which was stored with the status data in the dual ported memory by the primary processor. If the computed check sum is the same as that read out from the dual ported memory, the copy of the status data in the buffer memory section is used to update the record of the status data maintained by the back-up processor in the memory 38. This record will be in the same storage locations in the memory 38 that the various status values and information would be found if the back-up processor had carried out the CQ3 programs. Should the primary processor fail, the processing units 36 of the back-up processor executing CQ3 programs will then take over management of the input/output devices 19 making use of and operating on the updated record of the CQ3 status data in the random access memory 38 just as if it had been executing the CQ3 programs all along. The point at which each processing unit executing a CQ3 program will begin executing its CQ3 program is determined by the instruction pointer for that CQ3 program in the status data received by the back-up processor.

This instruction will always be the next instruction following the drop instruction. By including the CQ3 instruction pointers in the status data, the correct starting point of each CQ3 program in the back-up processor upon failure of the primary processor is conveniently determined while permitting the drop instruction to occur anywhere in each CQ3 program.

Each processing unit executing a CQ4 program, after executing each CQ4 program block, will copy the CQ4 status data for that block into the dual ported memory together with a check sum for the CQ4 status data. The CQ4 status data will include the CQ4 strategy, which is the sequence in which the blocks are to be executed, and the identification of the source of each input signal to a block to be executed, the identification of the block that was just executed, and the output value of the block that was just executed. The dual ported memory will have mapped therein a plurality of memory slots each designed to receive status data from one CQ4 program block. When a CQ4 processing unit in the primary processor completes a CQ4 block, it finds an empty memory slot in the dual ported memory and then transfers a copy of the CQ4 status data to this memory slot. The system processing unit 36a of the back-up processor, operating in the back-up mode, will transfer in sequence the copy of the CQ4 status data from each memory slot, one memory slot at a time, along with the check sum stored in the memory slot, into the buffer memory section of the random access memory 38. After reading the copy of the status data from each memory slot, the system processing unit 36a recomputes the check sum for that CQ4 status data block and compares it with the check sum read out from the memory slot. If the check sums are the same, the copy of the status data is used to update a record of CQ4 status data maintained in the random access memory 38. If the primary processor fails so that the back-up processor takes over active operation, each processing unit 36 of the back-up processor executing a CQ4 program will begin execution of the CQ4 program with the next CQ4 data block after the last valid CQ4 status data block that was received from the dual ported memory as determined by the strategy and block identification in the last valid CQ4 status data block for that CQ4 program.

Each central processing unit of the primary data processor, that is, the processing units 16, the real time executor, and the communications protocall controller, each has a memory location assigned to it in the random access memory 18 to be used as a mailbox, in which a counter value is stored. Every tenth of a second, each of the central processing units updates the counter value in its mailbox to a preset value and every tenth of a second, the system processing unit executes its mailbox task in which it decrements the count in each of these mailboxes. If the system processing unit finds that any mailbox value has been decremented to zero, the system processing unit transmits a message to the real time executor 14 to cause it to send the failover signal to the processor selector module 44 indicating that the primary processor has failed. In addition to the above mentioned mailbox, another memory location is provided to be the system mailbox and the system processing unit resets the count value in the system the count value in the system mailbox every tenth of a second. The real time executor decrements the count in the system mailbox every tenth of a second and if the real time executor ever finds that the system mailbox has been decremented to zero, the real time executor takes this fact as an indication that the primary processor has failed and sends the failover signal to the processor selector module 44. In addition, connected to the real time executor is a hardware timer which the real time executor periodically resets. Should this hardware timer time out, the real time executor will apply the failover signal to the processor selector module 44.

Figure 3:
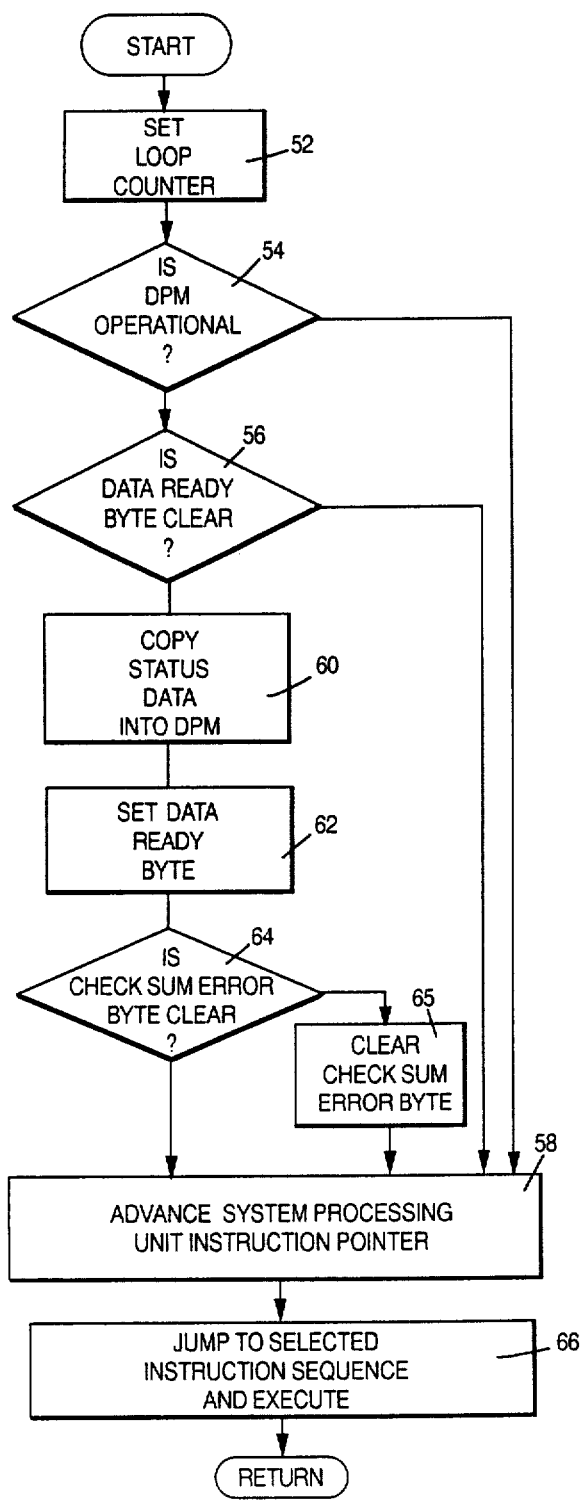
FIGS. 3 and 4 are flow charts of program routines employed in the system of the present invention to copy status data from a primary data processor into a dual ported memory at the remote station shown in FIG. 2.

The details of the drop routine executed by the system processing unit 16a to copy the CQ3 status data into the dual ported memory is represented by the flow chart shown in FIG. 3. As shown in FIG. 3, the drop rountine first executes an instruction sequence to set a loop counter in the random access memory 18 to a preset value. The system processor in the mailbox routine will decrement the loop counter every tenth of a second and, if the count in the loop counter ever is reduced to zero, this will indicate system failure and the system processor will send a message to the real time executor 14 indicting that the primary processor has failed, whereupon the real time executor 14 will apply the failover signal to the processor selector module 44.

After setting the loop counter, the drop rountine enters decision sequence 54 in which it is determined whether or not the dual ported memory is operational. This is carried out by writing a preset pattern into the dual ported memory and reading the pattern back. If the pattern comes back the same, this fact is taken as an indication that the dual ported memory is operational and the drop routine proceeds into decision sequence 56. If the pattern does not come back the same, the drop routine branches to instruction sequence 58.

In instruction sequence 56, the drop routine determines whether or not a byte in the dual ported memory, called the CQ3 data ready byte, is clear. If it is not clear, this means that the back-up processor has not read the last CQ3 status data out from the dual ported memory and the drop routine branches to instruction sequence 58. If the data ready byte is clear, the drop routine enters instruction sequence 60, in which the CQ3 status data is copied into the dual ported memory along with the check sum which is computed from the copied status data. The drop routine then in instruction sequence 62 sets the CQ3 data ready byte in the dual ported memory and then enters into decision sequence 64, in which the routine determines whether a byte in the dual ported memory, called the check sum error byte, is clear.

As explained above, the back-up processor recomputes the check sum from the CQ3 status data that is read out from the dual ported memory and compares it with the check sum that is stored along with the CQ3 status data. If the back-up processor determines that the recomputed check sum is not the same as the check sum read out from the dual ported memory, it sets the check sum error byte in the dual ported memory to indicate a check sum error. If the check sum error byte is not clear, the drop routine branches to instruction sequence 65, in which the check sum error byte is cleared and the routine enters instruction sequence 58. If the check sum error byte is clear, the routine enters directly into instruction sequence 58.

In instruction sequence 58, the drop routine advances the system processing unit instruction pointer by a variable amount. If the routine enters the instruction sequence 58 from the decision sequence 64 having determined that there was no check sum error and the drop routine has been executed by the primary data processor, the drop routine advances the instruction pointer by one. If the instruction sequence 58 is entered from decision sequence 54 as a result of the drop routine having determined that the dual ported memory 54 is not operational, then, in the primary processor, the drop routine will advance the system processing unit instruction pointer by three. If the drop routine enters instruction sequence 58 from the decision sequence 56, as a result of having determined that the data ready byte is not clear, the instruction pointer will be advanced by five in instruction sequence 58. If instruction sequence 58 is entered from instruction sequence 65 as a result of the check sum error byte not being clear, the instruction pointer will be advanced by seven.

Then, in instruction sequence 66, the program will carry out the instruction selected by the instruction pointer. This instruction will be a jump instruction to carry out a particular routine as may be desired by the user of the system. For example, if the instruction pointer was advanced by three, the program could jump to a routine in which a message is sent to the remote station R1, at which the control panel is located, indicating that the dual ported memory is not operational. Alternatively, a status flag could be set in the random access memory 18 indicating that the dual ported memory is not operational with this information to be furnished to the remote station or upon request therefrom. Similar routines could be carried out from instruction sequences selected in response to the instruction pointer being advanced by counts of five or seven to provide a message that the data ready byte was not being cleared or that a check sum error has occurred. If the instruction pointer is merely advanced by one, the selected routine may merely set a flag indicating that the drop rountine has been successfully completed.

In addition, in each routine selected and executed in instruction sequence 66, a flag will normally be set to indicate that it was the primary processor that carried out the drop routine. As explained above, when the back-up processor is caused to operate in an active mode, it will execute substantially the same identical programs that the primary processor executes. As a result, the system processing unit 36a of the back-up processor will periodically execute the drop routine, as illustrated in FIG. 3, except that in instruction sequence 58, instead of advancing the instruction pointer by one, three, five, or seven, the drop routine will advance the instruction pointer by two, four, six or eight and the routine to which the program jumps from the instruction selected by the instruction pointer after being advanced will set the status flag in the random access memory to indicate that it is the back-up processor which carried out the drop instruction. By means of this status flag, the system operator at the remote station R1, where the control panel is located, can determine whether or not it is the primary processor or the back-up processor which is managing the input/output devices.

This status flag, which indicates operation by the primary processor or the back-up processor, is one of the status flags which is transferred with the CQ3 status data. Accordingly, immediately after a failure has occurred and the back-up processor takes over operation, this status flag in the random access memory 38 of the back-up processor will be set to indicate that the primary processor is active, and this status flag will remain set to indicate that the primary processor is executive until the next time the drop routine is executed, this time by the back-up processor. Preferably, the system processing unit in the routines of instruction sequence 66 will determine whether the status flag is being changed from indicating that the primary processor is active to indicating that the back-up processor is active and, if so, will transmit a message to the remote station R1 indicating that a failure of the primary processor has occurred. After completing instruction sequence 66, the system processing unit returns to carry on with its system program and any applications program assigned to the system processing unit.

Figure 4:
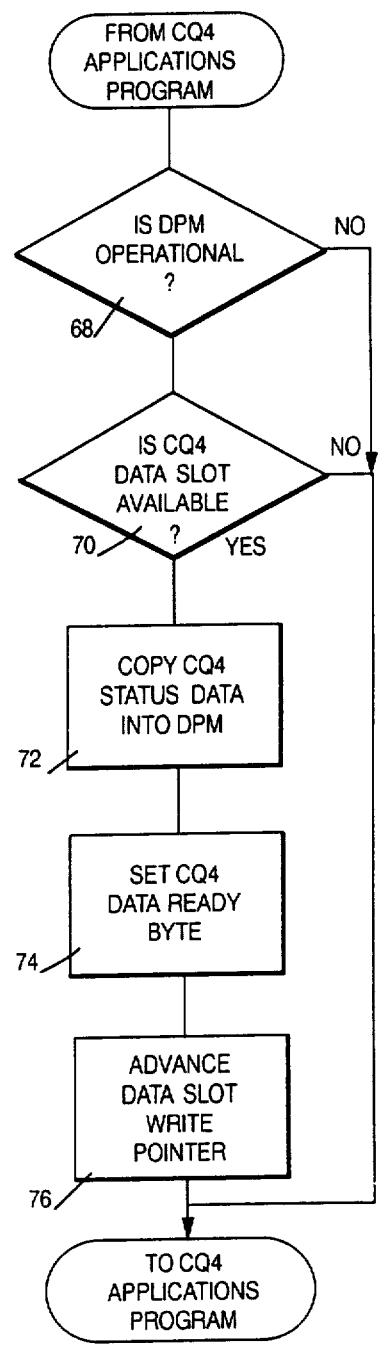

The copy routine executed by a processing unit 16 to copy the CQ4 status data into the dual ported memory after the execution of each CQ4 program block is represented by the flow chart shown in FIG. 4. As shown in FIG. 4, the copy routine first enters a decision sequence 68 in which it is determined whether the dual ported memory is operational in the same manner that the system processing unit 16a determines whether the dual ported memory is operational; that is, by writing a pattern into the dual ported memory, reading out the pattern and determining whether the pattern read out is the same as that written into the dual ported memory. If the copy routine determines in decision sequence 68 that the dual ported memory is not operational, the routine proceeds back into the CQ4 applications program to execute the next CQ4 applications block.

If, in decision sequence 68, it is determined that the dual ported memory is operational, the copy routine proceeds into decision sequence 70, in which it is determined whether or not a CQ4 status data slot is available in the dual ported memory. This is done by first examining the CQ4 data slot write pointer in the dual ported memory, which points to the next CQ4 data slot in the dual ported memory into which CQ4 status data is to be stored and then examining the CQ4 data ready byte in the CQ4 data slot selected by the write pointer. Each CQ4 data slot in the dual ported memory will have with it a data ready byte which is set when CQ4 status data is copied into the memory slot by the primary processor and which is cleared when the CQ4 status data is copied from the memory slot into the random access memory of the back-up processor. If this data ready byte in the memory slot selected by the write pointer is not clear, this means that all the CQ4 memory slots are full of status data which has not yet been copied into the random access memory of the back-up processor. Under these circumstances, the back-up processor is considered inoperative and the program branches out of the copy routine to continue the CQ4 applications program with the next CQ4 block.

If a CQ4 data slot is found to be available in the dual ported memory, the copy routine enters instruction sequence 72, in which the CQ4 status data is copied into the dual ported memory slot selected by the write pointer. After completing instruction sequence 72, the copy routine enters instruction sequence 74, in which the CQ4 data ready byte in the memory slot selected by the write pointer is set. Then, the copy routine advances the data slot write pointer in instruction sequence 76, whereupon the copy routine is completed and the program returns to the CQ4 applications program to execute the next CQ4 program block.

Figure 5A:
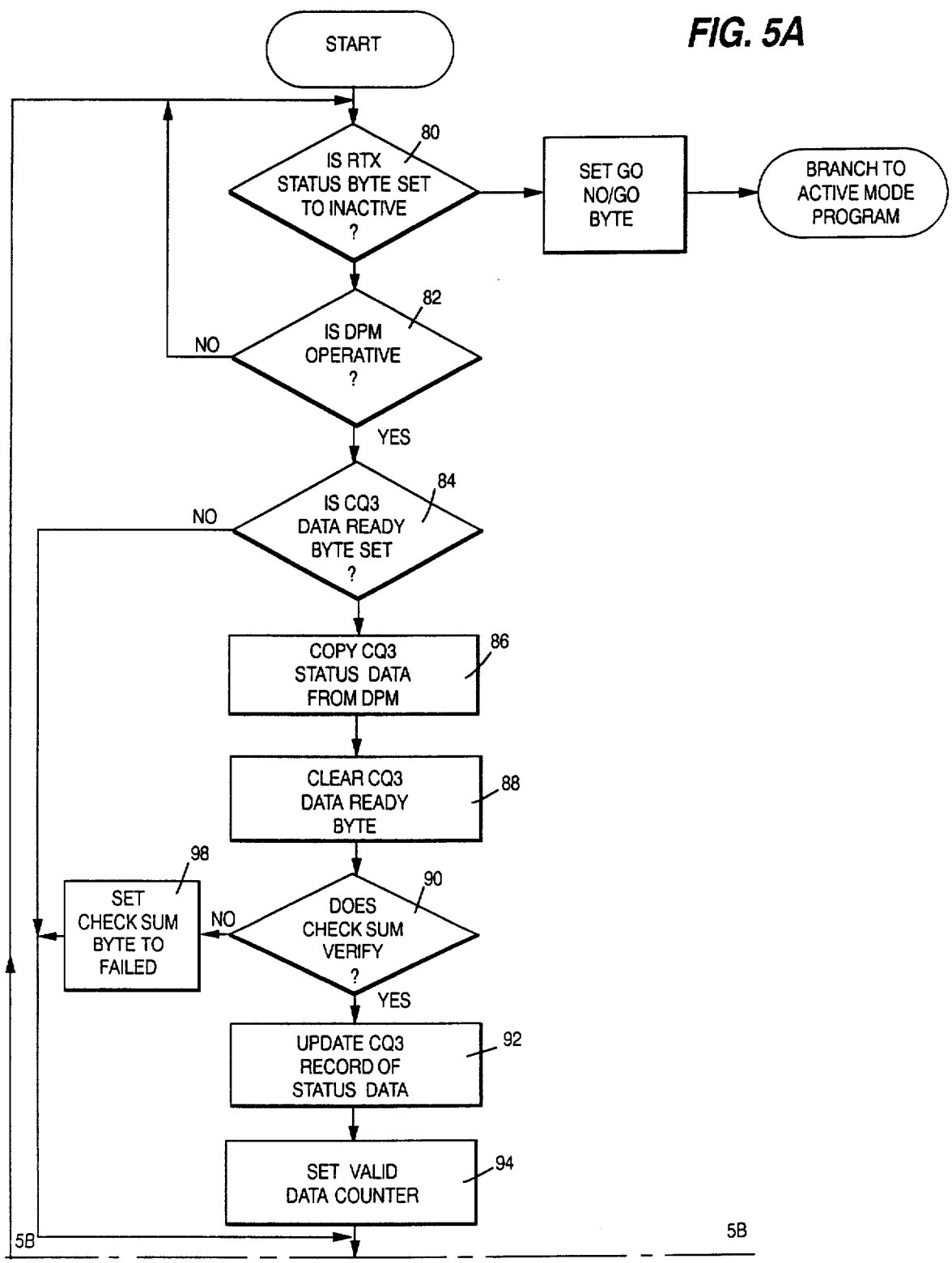
FIG. 5a and 5b illustrate a flow chart of a program routine employed in the system of the present invention to copy status data from the dual ported memory into the memory of a back-up data processor at the remote station shown in FIG. 2.
Figure 5B:
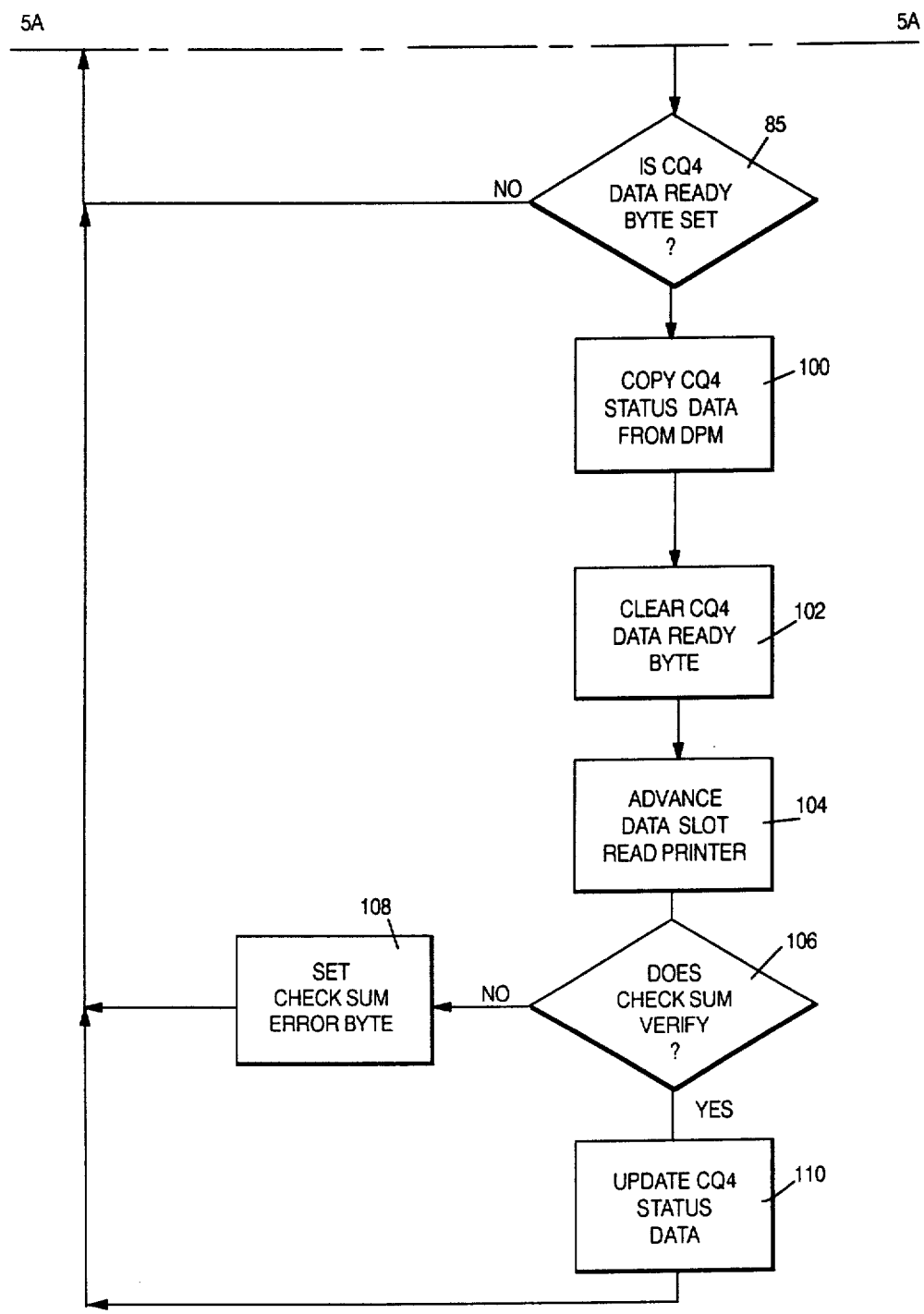

FIGS. 5a and 5b illustrate a flow chart showing the operation in detail of the systems processing unit 36a of the back-up processor when the back-up processor is operating in the back-up mode. As shown in FIG. 5a, the system program, after start up, enters decision sequence 80, in which it checks the status byte in the real time executor 34. If the status byte is set to INACTIVE, the program enters decision sequence 82 in which the program determines whether the dual ported memory is operational. This is done as in the drop and copy routines by writing a predetermined pattern into the dual ported memory, reading the pattern back out, and determining whether the pattern is the same. If the pattern is not the same, then the dual ported memory is considered inoperative and the program loops back to decision sequence 80 to repeat the instruction sequence.

If the dual ported memory is determined to be operational, the program enters decision sequence 84 in which it is determined if the CQ3 data ready byte in the dual ported memory has been set. If the CQ3 data ready byte has not been set, this means that there is no uncopied CQ3 status data in the dual ported memory and the program branches ahead to instruction sequence 85. If the CQ3 data ready byte has been set, the program enters instruction sequence 86 in which the CQ3 status data, along with the check sum, is copied from the dual ported memory into a buffer memory section of the random access 38. Then, in instruction sequence 88, the program clears the CQ3 data ready byte and enters decision sequence 90, in which the check sum is verified. This verification is carried out by recomputing the check sum from the CQ3 status data read out from the dual ported memory and comparing the computed check sum with that read out from the dual ported memory. If the check sum is not verified, the program branches into instruction sequence 98, in which the check sum byte in the dual ported memory is set to indicate a check sum failure. From instruction sequence 98 the program enters decision sequence 85. If the check sum is verified in decision sequence 90, the program enters instruction sequence 92, in which the CQ3 record of the status data maintained in the random access memory 38 is updated with the new copy of CQ3 status data in the buffer memory section of the random access memory 38. In instruction sequence 94, which follows instruction sequence 92, the program sets a counter called the valid data counter to a preset value. The system processing unit 36a in a mailbox routine in the back-up mode of operation every tenth of a second decrements the valid data counter and, if the count in this counter ever is decremented to zero, this means that the record of the status data maintained in the random access memory 38 is considered stale, in which case the program reinitializes all of the data or, in other words, sets all the status data to their initial or start-up values. After completion of the setting of the valid data counter, the program enters decision sequence 85.

In decision sequence 85, the program examines the CQ4 data ready byte in the CQ4 memory slot of the dual ported memory selected by a pointer in the dual ported memory, called the CQ4 data slot read pointer. The read pointer tells the program which is the next CQ4 status data memory slot from which CQ4 status data is to be read out. If the data ready byte in this memory slot is not set, this means that fresh CQ4 status data has not been stored in the dual ported memory since the last CQ4 status data was copied into the random access memory 38 and the program branches back to decision sequence 80 to start a new iteration through the back-up system program. If the CQ4 data ready byte has been set, the program enters decison sequence 100, in which the CQ4 status data stored in the memory slot selected by the read pointer is read into the buffer memory section of the random access memory 38 along with the check sum stored with the CQ4 status data. Then, in instruction sequence 102, the program clears the CQ4 data ready byte in the memory slot selected by the read pointer. Then, in instruction sequence 104, the program increments the data slot read pointer so that the next iteration through the instruction sequences 85, 100, and 102, the program will act on the next CQ4 memory slot in sequence.

Following instruction sequence 104, the program enters decision sequence 106 in which the check sum read out from the dual ported memory is verified by recomputing the check sum and comparing it with the check sum which was read out. If the check sum does not verify, the program branches to instruction sequence 108 in which the check sum error byte in the dual ported memory is set to failed and the program returns to decision sequence 80 to start another iteration through the back-up mode system program. If the check sum does verify, the program enters instruction sequence 110 in which the CQ4 status data updates the record of this status data maintained in the random access memory 38 whereupon the program returns to decision sequence 80 to start another iteration through the back-up mode program.

If, in decision sequence 80, it is determined that the status byte has been set to ACTIVE, the program branches to an instruction sequence 82 in which a go/-no-go byte in the random access memory is set to go and the system processing unit 36a then proceeds to carry out the active system program in exactly the same manner as has been described for the primary processor above. Each of the other processing units 36 of the back-up processor will repeatedly monitor the go/no-go byte in the random access memory in the back-up mode of operation. When this go/no-go byte gets set to go, each of these programs will branch to carry out its applications program in accordance with the record of the status data stored in the random access memory 38. The CQ3 processing units will start at the next instruction following the drop instruction. The processing units carrying out the CQ4 programs start executing the next CQ4 program block following the last CQ4 program block for which valid status data was received.

In the system described above, when a primary processor fails, the back-up processor takes over management of the input and output devices, making use of the latest valid status data transmitted to the random access memory of the back-up processor. Status data, which is transmitted to the back-up processor and which has been corrupted when the primary processor starts to fail, will not cause a process upset because of the validity check performed on the status data, by verifying the check sum, before the status data is used to update the record of the status data maintained in the memory of the back-up processor. In this manner, a smooth transition without process upset occurs when management of the input and output devices is transferred from the primary processor to the back-up processor upon failure of the primary processor.

The above description is of a preferred embodiment of the invention and many modifications may be made thereto without departing from the spirit and scope of the invention, which is defined in the appended claims.

I claim:

1. An industrial control system for managing a plurality of input/output devices comprising a primary data processor having a memory and operable to receive signals from said input/output devices, said primary data processor including a central processing unit operable to carry out an applications program and apply signals to said input/output devices in accordance with determinations made in said applications program to control said input/output devices, said primary processor maintaining in said memory of said primary processor a record of status data including a status data component representing a plurality of parameters of the current operation of said applications program, said central processing unit in carrying out said applications program operating on and in response to said status data in said current record maintained in the memory of said primary processor, a back-up data processor having a memory and having an active mode of operation and a back-up mode of operation, said back-up processor being operable in said active mode of operation to receive signals from said input/output devices, carry out said applications program and apply signals to said input/output devices in accordance with the determinations made in the applications program carried out by said back-up processor to control said input/output devices, said back-up processor maintaining a record of status data in the memory of said back-up processor corresponding to the record of status data maintained in the memory of said primary processor, said back-up processor, when carrying out said applications program, operating on and in response to the status data in the record thereof maintained in the memory of said back-up processor, said primary processor and said back-up processor operating in said back-up mode comprising means to periodically transfer a copy of the status data in the memory of said primary processor to a buffer memory section of the memory of said back-up processor, said means to transfer status data from the memory of said primary processor to a buffer memory section of the memory of said back-up processor including a dual ported memory connected between said primary processor and said back-up processor, said primary processor operating to periodically transfer a copy of the status data from the record of status data maintained by said primary processor in the memory of said primary processor to said dual ported memory, said back-up processor, when operating in said back-up mode, operating to periodically transfer a copy of the status data in said dual ported memory to the buffer memory section of the memory of said back-up processor, said central processing unit generating for each copy of status data transferred to said back-up processor information from which the validity of the status data can be determined, said information being included with the corresponding copy of status data transmitted to said back-up processor, said back-up processor including means operable when said back-up processor is in said back-up mode to determine from the entire content of said status data component and the corresponding information in each periodic copy of status data received in said buffer memory section whether said status data component is valid and, if the copy of said status data component is determined to be valid, to update the record of status data maintained in the memory of said back-up processor in accordance with the copy of the status data in said buffer memory section, means to monitor the condition of said primary processor independently of said status data and to generate a fail over signal when said primary processor fails, and means to switch said back-up processor from said back- up mode of operation to said active mode of operation in response to said fail over signal.

2. An industrial process control system as recited in claim 1, wherein said primary data processor sets a predetermined byte in said dual ported memory each time it stores a copy of the status data in said dual ported memory, said back-up processor clearing said predetermined byte in said dual ported memory each time it reads a copy of status data out of said dual ported memory and stores the status data copy in the buffer memory section of the memory of said back-up processor, said primary processor storing a copy of the status data in said dual ported memory only when said predetermined byte in said dual ported memory is clear and said back-up processor transferring the copy of the status data from the dual ported memory to the memory of the back-up processor only when said predetermined byte in said dual ported memory is set.

3. An industrial process control system as recited in claim 1, wherein said primary data processor comprises at least one processing unit to carry out said applications program, the memory of said primary data processor, communication means to apply signals to said input and output devices and a communications bus connected between said processing unit of said primary data processor, said memory of said primary data processor and said communication means of said primary data processor, said back-up data processor comprising at least one processing unit to carry out said applications program, the memory of said back-up processor, communication means to apply signals to said input/output devices, and a communications bus connected between the processing unit of said back-up processor, the memory of said back-up processor, and the communication means of said back-up processor, said dual ported memory connected between the communications bus of said primary processor and the communications bus of said back-up processor.

4. An industrial control system as recited in claim 1, wherein said information is a multibit check word and said primary processor transfers said multibit check word to said dual ported memory along with each copy of the status data periodically transferred by said primary processor to said dual ported memory, said multibit check word having a value depending upon the bits in the status data, the copy of which is stored in said dual ported memory, said backup processor when operating in said backup mode, operating to transfer the check word stored in said dual ported memory along with the copy of the status data in said dual ported memory to the memory of said backup processor, said backup processor carrying out a validity check on the copy of said status data received in said buffer memory section by recomputing the check word from the copy of the status data in the buffer memory section of the memory of said backup processor and comparing the recomputed check word with the check word transferred from said dual ported memory to the memory of said backup processor along with the copy of the status data.

5. An industrial control system for managing a plurality of input/output devices comprising a primary data processor having a memory and operable to receive signals from said input/output devices, said primary data processor including a plurality of processing units each operable to execute a corresponding applications program to control said input/output devices, each applications program comprising a set of instructions executed in sequence by the corresponding processing unit, said primary processor maintaining in said memory of said primary processor a record of status data including a status data component representing a plurality of parameters of the current operation of said applications programs, said each of said processing units in carrying out the corresponding applications program acting on and in response to the status data in said record of status data in the memory of said primary processor, a back-up data processor having a memory and having an active mode of operation and a back-up mode of operation, said back-up processor being operable in said active mode of operation to receive signals from said input/output devices, carry out said applications programs and apply signals to said input/output devices in accordance with the determinations made in the applications programs carried out by said back-up processor to control said input/output devices, said back-up processor maintaining a record of status data in the memory of said back-up processor corresponding to the record of status data maintained in the memory of said primary processor, said back-up processor, when carrying out said applications programs, operating on and in response to the status data in the record thereof maintained in the memory of said back-up processor, said primary processor and said back-up processor operating in said back-up mode comprising means to periodically transfer a copy of the status data in the memory of said primary processor to a buffer memory section of the memory of said back-up processor, each of the applications programs being executed by said processing units including a predetermined instruction at which a copy of the status data is to be transferred to the back-up processor, said means to transfer a copy of status data to the back-up processor operating to transfer the copy of status data when all of said central processing units have reached said predetermined instruction in the in the sequence of execution of the corresponding applications program, each of said processing units waiting in the sequence of execution of the corresponding applications program at said predetermined instruction until said means to transfer a copy of said status data has completed the readout of a copy of the status data from the memory of said primary processor, said central processing unit generating for each copy of status data transferred to said back up processor information from which the validity of the status data can be determined, said information being included with the corresponding copy of status data transmitted to said back-up processor, said back-up processor including means operable when said back up processor is in said back-up mode to determine from the entire content of said status data component and the corresponding information in each periodic copy of status data received in said buffer memory section whether said status data component is valid and, if the copy of said status data component is determined to be valid, to update the record of status data maintained in the memory of said back-up processor in accordance with the copy of the status data in said buffer memory section, means to monitor the condition of said primary processor independently of said status data and to generate a fail over signal when said primary processor fails, and means to switch said back-up processor from said back-up mode of operation to said active mode of operation in response to said fail over signal.

6. An industrial control system for managing a plurality of input/output devices comprising a primary data processor having a memory and operable to receive signals from said input/output devices, said primary data processor including a central processing unit operable to carry out an applications program and apply signals to said input/output devices in accordance with determinations made in said applications program to control said input/output devices, said primary processor maintaining in said memory of said primary processor a record of status data including a status data component representing a plurality of parameters of the current operation of said applications program, said central processing unit in carrying out said applications program operating on and in response to said status data in said current record maintained in the memory of said primary processor, a back-up data processor having a memory and having an active mode of operation and a back-up mode of operation, said back-up processor being operable in said active mode of operation to receive signals from said input/output devices, carry out said applications program and apply signals to said input/output devices in accordance with the determinations made in the applications program carried out by said back-up processor to control said input/output devices, said back-up processor maintaining a record of status data in the memory of said back-up processor corresponding to the record of status data maintained in the memory of said primary processor, said back-up processor, when carrying out said applications program, operating on and in response to the status data in the record thereof maintained in the memory of said back-up processor, said primary processor and said back-up processor operating in said back-up mode comprising means to periodically transfer a copy of the status data in the memory of said primary processor to a buffer memory section of the memory of said back-up processor, said applications program comprising a series of arithmetic functions performed in sequence with each function producing a variable output value as a function of one or more input values, said status data including the variable output value produced by each arithmetic function performed in said applications program, said means to transfer a copy of said status data to the memory of said back-up processor operating to read out from the memory of said primary processor the output value of each arithmetic function at the time said applications program completes said arithmetic function to initiate the transfer of this portion of the copy of the status data to the memory of the back-up processor, said central processing unit generating for each copy of status data transferred to said back up processor information from which the validity of the status data can be determined, said information being included with the corresponding copy of status data transmitted to said back-up processor, said back-up processor including means operable when said back up processor is in said back-up mode to determine from the entire content of said status data component and the corresponding information in each periodic copy of status data received in said buffer memory section whether said status data component is valid and, if the copy of said status data component is determined to be valid, to update the record of status data maintained in the memory of said back-up processor in accordance with the copy of the status data in said buffer memory section, means to monitor the condition of said primary processor independently of said status data and to generate a fail over signal when said primary processor fails, and means to switch said back-up processor from said back-up mode of operation to said active mode of operation in response to said fail over signal.

7. An industrial control system for managing a plurality of input/output devices comprising a primary data processor having a memory and operable to receive signals from said input/output devices, said primary data processor including a central processing unit operable to carry out an applications program and apply signals to said input/output devices in accordance with determinations made in said applications program to control said input/output devices, said primary processor maintaining in said memory of said primary processor a record of status data including a status data component representing a plurality of parameters of the current operation of said applications program, said central processing unit in carrying out said applications program operating on and in response to said status data in said current record maintained in the memory of said primary processor, a back-up data processor having a memory and having an active mode of operation and a back-up mode of operation, said back-up processor being operable in said active mode of operation to receive signals from said input/output devices, carry out said applications program and apply signals to said input/output devices in accordance with the determinations made in the applications program carried out by said back-up processor to control said input/output devices, said back-up processor maintaining a record of status data in the memory of said back-up processor corresponding to the record of status data maintained in the memory of said primary processor, said back-up processor, when carrying out said applications program, operating on and in response to the status data in the record thereof maintained in the memory of said back-up processor, said primary processor and said back-up processor operating in said back-up mode comprising means to periodically transfer a copy of the status data in the memory of said primary processor to a buffer memory section of the memory of said back-up processor, said central processing unit generating for each copy of status data transferred to said back-up processor information from which the validity of the status data can be determined, said information being included with the corresponding copy of status data transmitted to said back-up processor, said back-up processor including means operable when said back up processor is in said back-up mode to determine from the entire content of said status data component and the corresponding information in each periodic copy of status data received in said buffer memory section whether said status data component is valid and, if the copy of said status data component is determined to be valid, to update the record of status data maintained in the memory of said back-up processor in accordance with the copy of the status data in said buffer memory section, means to monitor the condition of said primary processor independently of said status data and to generate a fail over signal when said primary processor fails, and means to switch said back-up processor from said back-up mode of operation to said active mode of operation in response to said fail over signal, said status data including an instruction pointer designating the next instruction to be executed by said applications program, said back-up processor beginning operation to carry out said applications program upon failure of said primary processor at the instruction designated in the copy of said instruction pointer transferred to the memory of said back-up processor by said means to transfer a copy of status data from the memory of said primary processor to the memory of said back-up processor.

8. An industrial control system as recited in claim 6, wherein said means to transfer a copy of the status data to the memory of the back-up processor comprises a dual ported memory connected between said primary processor and said back-up processor, said primary processor storing in said dual ported memory each output value of an arithmetic function of the applications program as it is read out from the memory of said primary processor, storing successive output values of the arithmetic functions in successive memory slots in said dual ported memory, said back-up processor reading out the output values from said successive memory slots and storing the values in the buffer memory section in the memory of said back-up processor in the same sequence that said output values are stored in said dual ported memory.

* * * * *